(12) United States Patent
Lardellier (10) Patent No.: US 7,237,378 B2
(45) Date of Patent: Jul. 3, 2007

(54) TURBOMACHINE WITH LOW NOISE EMISSIONS FOR AIRCRAFT

(75) Inventor: Alain Marie Joseph Lardellier, Melun (FR)

(73) Assignee: Snecma Moteurs, Paris (FR)

( * ) Notice: Subject to any disclaimer, the term of this patent is extended or adjusted under 35 U.S.C. 154(b) by 366 days.

(21) Appl. No.: 10/914,132

(22) Filed: Aug. 10, 2004

(65) Prior Publication Data

US 2005/0060983 A1    Mar. 24, 2005

(30) Foreign Application Priority Data

Aug. 18, 2003   (FR)   ................................... 03 50435

(51) Int. Cl.
*F02K 1/48*       (2006.01)
*F02K 3/06*       (2006.01)
*F02K 3/072*      (2006.01)

(52) U.S. Cl. .................... 60/226.1; 60/262; 60/264; 60/268

(58) Field of Classification Search .............. 60/226.1, 60/262, 264, 268; 181/213, 220
See application file for complete search history.

(56) References Cited

U.S. PATENT DOCUMENTS

| 2,430,398 | A | * | 11/1947 | Heppner ...................... 60/264 |
| 2,721,445 | A |   | 10/1955 | Giliberty |
| 3,100,627 | A | * | 8/1963  | Wilde ........................... 60/262 |
| 3,508,403 | A | * | 4/1970  | Neitzel ......................... 60/262 |
| 3,589,132 | A | * | 6/1971  | Du Pont ....................... 60/262 |
| 3,903,690 | A | * | 9/1975  | Jones ........................ 60/39.08 |
| 5,014,508 | A | * | 5/1991  | Lifka ........................... 60/268 |
| 5,105,618 | A | * | 4/1992  | Lardellier .................... 60/268 |
| 5,117,628 | A |   | 6/1992  | Koshoffer |
| 5,832,715 | A |   | 11/1998 | Dev |
| 6,553,765 | B2 | * | 4/2003 | Bregentzer ................... 60/723 |

FOREIGN PATENT DOCUMENTS

CH     258 110     11/1948

* cited by examiner

*Primary Examiner*—Ted Kim
(74) *Attorney, Agent, or Firm*—Oblon, Spivak, McClelland, Maier & Neustadt, P.C.

(57) ABSTRACT

The invention relates to a turbomachine (1) for an aircraft comprising a gas generator (4) designed such that hot gases are ejected from a combustion chamber (28) towards the upstream side of the turbomachine, and also comprising a plurality of hollow mixer struts (40) connected to an output (36) from the gas generator through which hot gases can pass, each mixer strut comprising an output mixer portion (40*c*) located inside the annular fan duct (8) so as to mix the secondary air and the hot gases ejected by these output mixer portions towards the downstream side of the turbomachine.

9 Claims, 5 Drawing Sheets

FIG. 5

TURBOMACHINE WITH LOW NOISE EMISSIONS FOR AIRCRAFT

TECHNICAL FIELD

This invention relates generally to a turbomachine for the propulsion of an aircraft, and more particularly a turbomachine with a design capable of reducing noise emissions produced by this turbomachine.

STATE OF PRIOR ART

Typically, an aircraft turbomachine has a fan driven by a gas generator that may for example be of the single-shaft, twin-shaft, or three-shaft type.

For example, a gas stream passes through all components of the gas generator from the upstream side towards the downstream side of the turbomachine, namely along a main direction of the gas stream through the turbomachine.

This conventional type of turbomachine architecture causes noise emissions that can be very harmful to the environment, particularly when an aircraft fitted with this type of turbomachine is close to an airport.

Three main noise sources cause these emissions.

The first of these three noise sources is the fan that generates large amounts of noise, largely due to aerodynamic shocks developed around the outer part of the blades of this fan which turn at a very high speed.

Furthermore, noise emissions also originate from the combustion chamber which forms an integral part of the turbomachine gas generator.

In this precise case, noise is caused essentially by combustion reactions occurring within the chamber.

Finally, the third main source of noise emissions consists of jets escaping from the turbomachine. These include hot gases originating from the gas generator and ejected backwards from the turbomachine towards the downstream side, and secondary air circulating inside an annular fan duct and also being ejected from the turbomachine in the downstream direction.

Noise caused by hot gases and secondary air output from the turbomachine is then added to noise generated by hot gases, which is usually preponderant due to the higher hot gas ejection velocity.

Several embodiments have been proposed to reduce noise emissions produced by these aircraft turbomachines.

A first well-known proposal consists firstly of arranging a lobed mixer at the output from the turbomachine, such that hot gases and secondary air can be mixed to form a single stream generating less noise, mainly due to its fairly uniform ejection velocity, lower than the hot gas ejection velocity.

However, this type of architecture considerably increases the length of the turbomachine, due to the addition of a mixer with sufficiently large dimensions to be capable of mixing sufficiently to significantly reduce jet noise.

Moreover, with this type of configuration, the length of the casing delimiting the outside of the annular duct of the fan must also be increased, such that secondary air is carried as far as the mixer and is not ejected from the turbomachine before coming into contact with it.

Consequently, all these modifications directly cause an unwanted increase in the global mass and dimensions of the turbomachine.

Another solution frequently proposed consists of replacing a so-called "conventional" fan by two counter rotating fans, for which it is well-known that noise emissions are lower than corresponding noise emissions from a conventional fan with equivalent aerodynamic performances.

Nevertheless, although this solution is globally satisfactory in terms of reducing fan noise, it has absolutely no effect on jet noise or combustion chamber noise, although combustion chamber noise constitutes a very significant part of the global emissions of noise generated by the turbomachine.

OBJECT OF THE INVENTION

Therefore, the object of the invention is to propose a turbomachine for an aircraft at least partially correcting the disadvantages mentioned above with embodiments according to prior art.

More precisely, the object of the invention is to present a turbomachine for an aircraft with an architecture that reduces noise emissions produced compared with noise emissions encountered with embodiments according to prior art.

To achieve this, the purpose of the invention is a turbomachine for an aircraft comprising a gas generator with a combustion chamber and driving at least one fan, the turbomachine being provided with an annular fan duct through which secondary air circulates from the upstream side towards the downstream side of the turbomachine. According to the invention, the gas generator is designed such that hot gases are ejected from the combustion chamber towards the upstream side of the turbomachine, and the turbomachine also comprises a plurality of hollow mixer struts connected to an output from the gas generator through which hot gases can pass, each mixer strut comprising an output mixer portion located inside the annular fan duct so as to make a mix between the secondary air and the hot gases ejected by these output mixer portions towards the downstream side of the turbomachine.

Advantageously, this architecture specific to this invention can firstly considerably reduce jet noise, in that secondary air and hot gases are mixed inside the annular fan duct by means of the mixer struts, and more specifically by means of their output mixer portions located inside this duct.

Mixing is done firstly due to the fact that the secondary air circulating inside the annular fan duct matches the outer surface defined by the output mixer portions of the struts, and also that the hot gases match the inner surface defined by the output mixer portions of the struts, before they are ejected from these mixer portions into the annular fan duct in the same direction as the secondary air, namely from the upstream side towards the downstream side of the turbomachine. Thus, particularly due to the fact that the plurality of mixer struts provides a large "wetted surface area" between the secondary air and the hot gases, all conditions are satisfied such that these two streams mix easily as soon as hot gases are ejected from the output mixer portions, then forming a single approximately homogenous stream escaping from the annular fan duct.

Moreover, the presence of this plurality of mixer struts injecting hot gases in the fan duct makes it unnecessary to add a mixer at the output from the turbomachine, which would be inconvenient, or to add a downstream extension of the casing delimiting the outer surface of the annular fan duct, as is done in prior art to guide secondary air as far as the mixer, and therefore to assure a genuine mix of the gas streams.

This architecture is compact, particularly due to the said "inverted" position of at least part of the elements forming part of the gas generator, including at least the combustion chamber, through which the gas stream passes in the direction from the downstream side to the upstream side.

In this respect, this inversion of at least one part of the gas generator has the result of leading hot gases towards the upstream side of the turbomachine, which makes it easy to eject hot gases into an upstream part of the annular fan duct, or at least into a portion remote from the output from this duct. In this way, the possibility of ejecting hot gases through output mixer portions into a relatively remote part of the output from the annular fan duct is extremely advantageous, to the extent that the homogeneity of the single stream obtained at the output from the annular fan duct increases as the length of the part of this duct through which the secondary air and the hot gases pass increases.

Thus, with the turbomachine according to the invention, the single stream obtained at the output from the fan duct and ejected from the turbomachine may be very uniform, and consequently contributes towards making a considerable reduction to jet noise emitted by this turbomachine.

It has also been observed that the inverted position of the combustion chamber satisfactorily and advantageously enables attenuation of noise emitted by this combustion chamber. The fact that hot gases are ejected from the combustion chamber towards the upstream side of the turbomachine implies that noise generated by the turbomachine is propagated mainly in the same direction, namely towards the upstream side of the turbomachine. Since hot gases are introduced into the annular fan duct near the downstream end, the turbomachine necessarily has a structure, for example a cranked type structure, such that the direction of the hot gas streams between the combustion chamber and the output from the mixer struts can be inverted, for example this structure may form an integral part of these same mixer struts. It has thus been observed that this structure is advantageously capable of absorbing some of the noise emitted by the combustion chamber.

Consequently, it is obvious that the arrangement proposed by the invention is completely different from previous arrangements in which the combustion chamber radiated towards the downstream side of the turbomachine without any major cranked type structure obstacle, therefore generating almost no attenuation of noise emitted by this combustion chamber.

Preferably, the turbomachine gas generator is a twin shaft gas generator, preferably comprising a low pressure compressor through which combustion air passes from the upstream side towards the downstream side, a high pressure compressor through which combustion air passes from the downstream side towards the upstream side, the combustion chamber, and a high pressure turbine and a low pressure turbine, with hot gases passing through each in the direction from the downstream side towards the upstream side of the turbomachine.

Obviously, the gas generator could also be of the three shaft type or even a single shaft type without going outside the scope of the invention.

Moreover, the gas generator is designed such that the high pressure turbine drives the high pressure compressor, and such that the low pressure turbine drives the low pressure compressor and each of the turbomachine fans.

According to a first preferred embodiment of this invention, the turbomachine is provided with a single fan.

According to a second preferred embodiment of this invention, the turbomachine is provided with two counter-rotating fans.

Thus, the turbomachine proposed in this second preferred embodiment firstly reduces the noise from the jets and the combustion chamber as indicated above, and also minimises fan noise due to the use of these counter rotating fans with noise reduction effects known to those skilled in the art.

Preferably, the turbomachine comprises a noise suppression structure surrounding the gas generator, the noise suppression structure delimiting the inner part of the annular fan duct and being closed at the back of the turbomachine. Note that this structure is designed mainly to even further attenuate noise emitted by the turbomachine from the combustion chamber.

It could be possible for each mixer strut to be provided with an input portion through which hot gases pass in the direction from the downstream side towards the upstream side, with the output mixer portion on the inside of the annular fan duct and through which these same hot gases pass in the direction from the upstream side to the downstream side, the input and output portions being connected through a cranked portion.

In this case, the turbomachine will preferably be made such that the output mixer portion of each mixer strut is approximately in the shape of a lobed mixer, and such that these output mixer portions of the mixer struts are uniformly spaced inside the annular fan duct.

Other advantages and characteristics of the invention will become clear from the following detailed and non-limitative description.

BRIEF DESCRIPTION OF THE DRAWINGS

This description will be made with reference to the attached drawings among which.

DETAILED DESCRIPTION PREFERRED EMBODIMENTS

Figure 1:
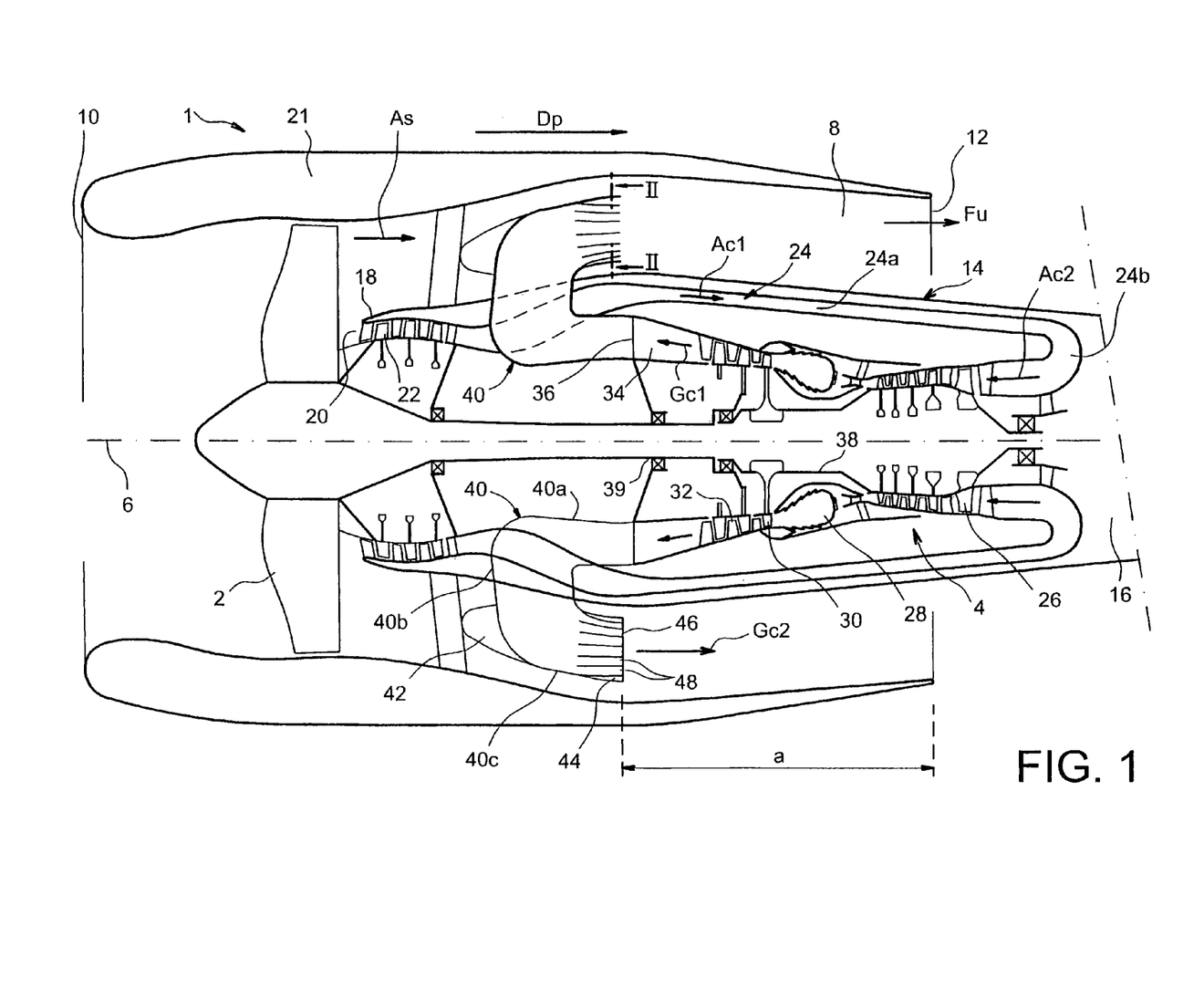
FIG. 1 shows a longitudinal sectional view through a turbomachine according to a first preferred embodiment of this invention.

FIG. 1 shows a turbomachine 1 for an aircraft according to a first preferred embodiment of this invention.

The turbomachine 1 comprises a single conventional fan 2 driven by a twin shaft type gas generator 4 arranged on the downstream side of this fan 2.

The turbomachine 1 with its main longitudinal axis 6 has an annular fan duct 8 which extends between an input 10 on the front of the turbomachine 1 and close to the fan 2, as far as an output 12 located further towards the downstream side.

The inner part of the annular fan duct 8 is delimited by a noise suppression structure 14 surrounding the gas generator 4, this structure 14 particularly forming the ogive-shaped closed back 16 of the turbomachine 1. Moreover, the noise suppression structure 14 is provided with an open front part 18 close to the fan 2 and on its downstream side, this open front part 18 delimiting the outer part of an annular input 20 to the gas generator 4. Furthermore, the annular fan duct 8 is also delimited on the outside by an external casing 21, as is well known to those skilled in the art.

During operation, secondary air passes through the annular fan duct 8 in the direction from the upstream side towards the downstream side of the turbomachine 1, as shown diagrammatically by the arrow As in FIG. 1. Note that secondary air therefore circulates parallel to a main gas stream direction through the turbomachine 1, this direction parallel to the main longitudinal axis 6 being represented by the arrow Dp in this same FIG. 1.

In general, the gas generator 4 comprises firstly a low pressure axial compressor 22 called the "LP compressor 22" in the remainder of this description. This LP compressor 22 is located approximately at the annular input 20 to the gas generator 4, on the downstream side of this annular input 20, and therefore adjacent to the open front part 18 of the noise suppression structure 14.

At the output from the LP compressor 22, the gas generator 4 comprises an annular stream 24 that is also delimited on the outside by the noise suppression structure 14, this annular stream 24 being provided with a main portion 24a largely surrounding the gas generator 4 of the turbomachine 1, approximately parallel to the main longitudinal axis 6. As can be seen in FIG. 1, the annular stream 24 is provided with a downstream end in the form of a cranked portion 24b prolonging the main portion 24a, this cranked portion 24b having the function of inverting the flow direction of gases inside the gas generator 4, as will be explained more precisely below. Note that the cranked portion 24b is preferably made such that the gas stream passing through it becomes close to the main longitudinal axis 6 of the turbomachine 1, as can be seen clearly in FIG. 1.

Starting from the cranked portion 24b of the annular stream 24, the gas generator 4 comprises, in sequence working from the downstream side towards the upstream side of the turbomachine 1, a high pressure compressor 26 called the "HP compressor 26" in the remainder of this description, a combustion chamber 28, and a high pressure turbine 30 and a low pressure turbine 32 called the "HP turbine 30" and the "LP turbine 32" respectively in the remainder of this description, the LP turbine 32 being located on the downstream side of the LP compressor 22 as can be seen in FIG. 1.

In this way, it is understandable that combustion air circulates firstly in the direction from the upstream side towards the downstream side of the turbomachine 1, in sequence through the fan 2, the LP compressor 22 and the main portion 24a of the annular stream 24 as shown diagrammatically by arrow Ac1. The partially compressed combustion air then passes through the cranked portion 24b after passing through almost the entire turbomachine 1 towards the downstream direction approximately parallel to the direction Dp of the main gas flow. Thus, combustion air output from this cranked portion 24b can then circulate in the gas generator 4 along a direction opposite to this main gas flow direction Dp, namely in the direction from the downstream side towards the upstream side, as shown diagrammatically by arrow Ac2.

In this respect, combustion air circulates towards the upstream side through the HP compressor 26 before entering the combustion chamber 28, from which hot gases expand in sequence towards the upstream side through the HP turbine 30 and then the LP turbine 32 as shown diagrammatically by arrow Gc1 in FIG. 1.

Finally, at the output from the LP turbine 32, the hot gases pass along a secondary annular stream 34, in the direction towards the upstream side of the turbomachine 1 as far as an annular output 36 from the gas generator 4.

It is also mentioned that conventionally, in twin shaft gas generator turbomachines, the HP turbine 30 drives the HP compressor 26 through a first shaft 38, and the LP turbine 32 drives the LP compressor 22 and the fan 2 through a second shaft 39, which is arranged on the upstream side of the first shaft 38.

The turbomachine 1 also comprises several hollow mixer struts 40, each being connected to the annular output 36 from the gas generator 4 so that hot gases output from it can pass through each mixer strut. Furthermore, the mixer struts 40 are designed so as to create a mix inside the annular fan duct 8, between the secondary air the hot gases ejected by these same mixer struts 40.

More precisely, still with reference to FIG. 1, each hollow mixer strut 40 has an input portion 40a communicating directly with an opening (not shown) from the output 36 from the gas generator 4. Preferably, it would be possible for the hot gases to pass through this input portion 40a in the direction from the downstream side towards the upstream side, which would therefore form an extension of the secondary annular stream 34 of the gas generator 4.

The input portion 40a is connected to a cranked portion 40b, which once again performs the function of inverting the gas flow direction inside the gas generator 4, as will be explained more precisely below. Note that the cranked portion 40b is preferably made such that the gas stream passing through it moves away from the main longitudinal axis 6 of the turbomachine 1, as can be seen clearly in FIG. 1.

Finally, the cranked portion 40b is fixed to an output mixer portion 40c located on the inside of the annular fan duct 8 and arranged such that hot gases are ejected towards the downstream side of the turbomachine 1, and therefore parallel to the main gas flow direction represented by the arrow Dp.

Thus, hot gases output from the input portion 40a then pass along the cranked portion 40b where their direction of circulation is gradually changed due to the specific shape of this cranked portion 40b, the hot gases continuing to be deviated by the output mixer portion 40c so as to be ejected from it towards the downstream side inside the annular fan duct 8, as shown diagrammatically by arrow Gc2.

As indicated above, hot gases ejected from the combustion chamber 28 towards the upstream side of the turbomachine 1 imply that noise generated by the turbomachine will be propagated mainly in the same direction. In this respect, it has been observed that advantageously, the mixer struts 40 and more particularly their cranked portions 40b are capable of absorbing some of the noise emitted by the combustion chamber 28. This is explained particularly by the fact that the cranked portions 40b form mechanical barriers to the propagation of sound waves originating from the combustion chamber 28 and mostly travelling in the direction towards the upstream side of the turbomachine 1 due to its inverted position.

The output mixer portion 40c of each mixer strut 40 is preferably provided with an outer globally conical profile with an axis (not shown) parallel to the main longitudinal axis 6, and with a section increasing towards the downstream side of the turbomachine 1. Furthermore, the output mixer portion 40c comprises a closed upstream end part 42 and an open downstream end part 44, in particular defining an output 46 from the output mixer portion 40c.

In this way, the outer profile of the output mixer portions 40c is quite suitable for enabling secondary air circulating inside the annular fan duct 8 and coming into contact with these portions 40c, to match the outer surface of these portions without being subjected to excessive aerodynamic losses.

It is fairly obvious that the secondary air and hot gases start to mix as soon as they escape from the output 46 defined by the downstream end part 44. Thus, each output mixer portion 40c is adapted such that secondary air and hot gases are brought into the best possible conditions so that they can be homogeneously mixed as soon as these hot gases are ejected into the annular fan duct 8, this adaptation for example possibly being materialised by ensuring that the downstream end part 44 has several corrugations 48, also called "lobes".

Figure 2:
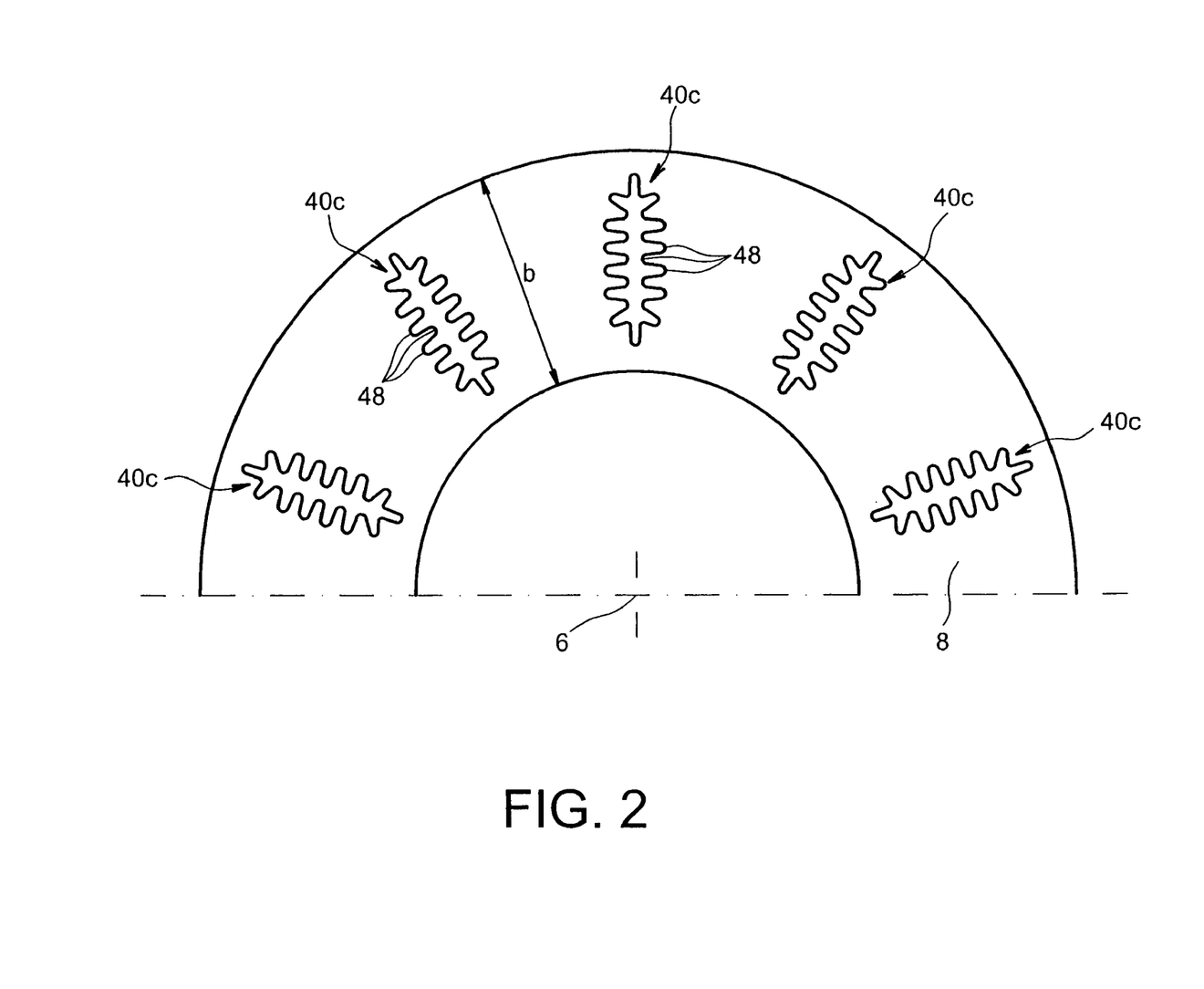
FIG. 2 shows a sectional view along the length of line II—II in FIG. 1.

With reference jointly to FIGS. 1 and 2, it can be seen that the downstream end part 44 of each mixer strut 40 has several corrugations 48 for which the function is to increase the "wetted area" in other words the fictitious contact surface area between secondary air and hot gases, at the time that they are ejected from the mixer struts 40. In this respect, note that simply increasing this wetted surface provides a means of effectively encouraging posterior homogenisation of gas streams located on each side of this fictitious surface.

As an illustrative example and more specifically with reference to FIG. 2, it can be seen that each downstream end part 44 has a generally rectangular cross-section, the large sides of this rectangle extending approximately in a radial direction (not shown) of the turbomachine 1, and in fact being lines composed of several successive and inverted corrugations 48. Consequently, the large sides of this rectangle are composed of lines that can be treated like sine curves. Also as an example, the large sides of the rectangle at the output 46 from the downstream end part 44 extend over about 60% to about 90% of the average radial thickness "b" of the annular fan duct 8, in which these large sides are preferably approximately centred.

It would also be possible to arrange for the small sides of the rectangles to have a shape similar to the shape of the large sides, without going outside the scope of the invention.

Naturally, other shapes could be selected for the cross-section of the downstream end part 44 of the output mixer portion 40c, for example like a circle also defined by a regularly corrugated line.

It is also indicated that the amplitude of the corrugations 48 should gradually increase as the downstream end part 44 moves towards the downstream side of the turbomachine 1, as can be seen in FIG. 1, to avoid causing excessive disturbances to the secondary air flow when it comes into contact with the output mixer portions 40c.

It is also specified that these corrugations 48 could be initiated on the upstream side of the downstream end part 44 of the output mixer portions 40c without going outside the scope of the invention.

Preferably, the output 46 from each mixer strut 40 is located at a relatively long distance from the output 12 from the annular fan duct 8. This results in a single and highly uniform stream at the output from the turbomachine 1, and more precisely at the output 12 from the annular fan duct 8, this single stream being shown diagrammatically by the arrow Fu.

In fact, as the length "a" along which the secondary air and hot gases pass together increases, this length "a" being the axial distance between the output 46 and the output 12, the more uniform the single stream Fu ejected from the turbomachine 1 will become, and therefore jet noise emissions will be reduced.

Also for illustrative purposes, it is possible to design the turbomachine 1 such that the ratio of the lengths a/b is between 2 and 4, the length "b" corresponding to the average radial thickness of the annular fan duct 8.

Finally, note that the number of mixer struts 40 inside the annular fan duct 8 may be adapted as a function of the needs encountered, and that they are preferably arranged such that the output mixer portions 40c are regularly distributed inside this duct 8. In this respect, note that the fact that a large number of output mixer portions 40c (for example more than 12) are provided, obviously results in a large wetted surface area, such that the downstream end parts 44 could then be used for the formation of a satisfactory uniform single flow without necessarily having any corrugations 48. In this configuration, the output 46 could for example be designed simply so as to have a circular or rectangular cross-section with no corrugations.

Figure 3:
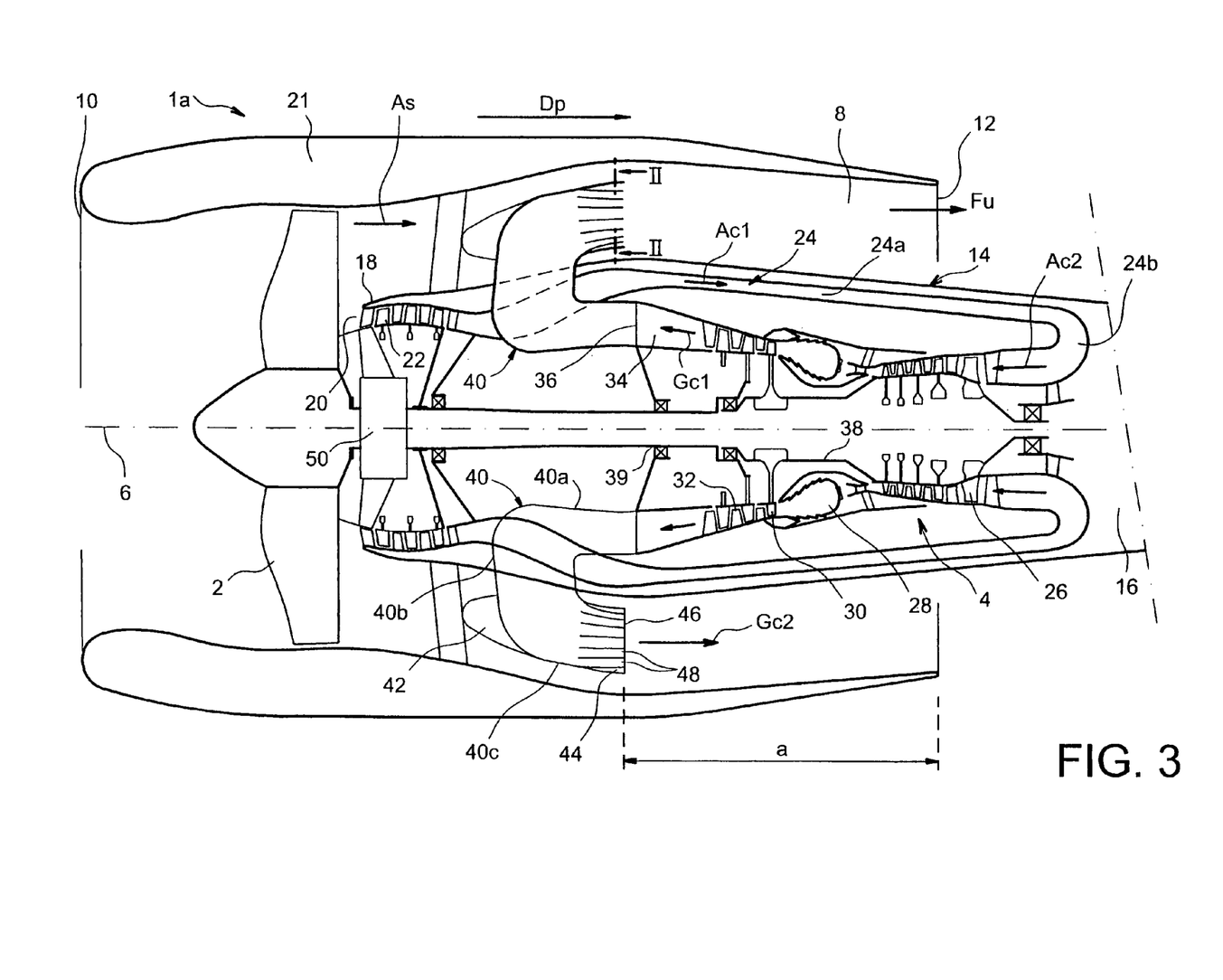
FIG. 3 shows a longitudinal sectional view through a turbomachine according to an alternative to the first preferred embodiment shown in FIG. 1.

FIG. 3 shows a turbomachine 1a according to one alternative of the first preferred embodiment described above.

As can be seen in this Figure, the only difference is in the fact that the fan 2 is no longer driven directly using the second shaft 39, but through a speed reduction gear 50 fixed to it and arranged between the LP turbine 32 and this fan 2.

Figure 4:
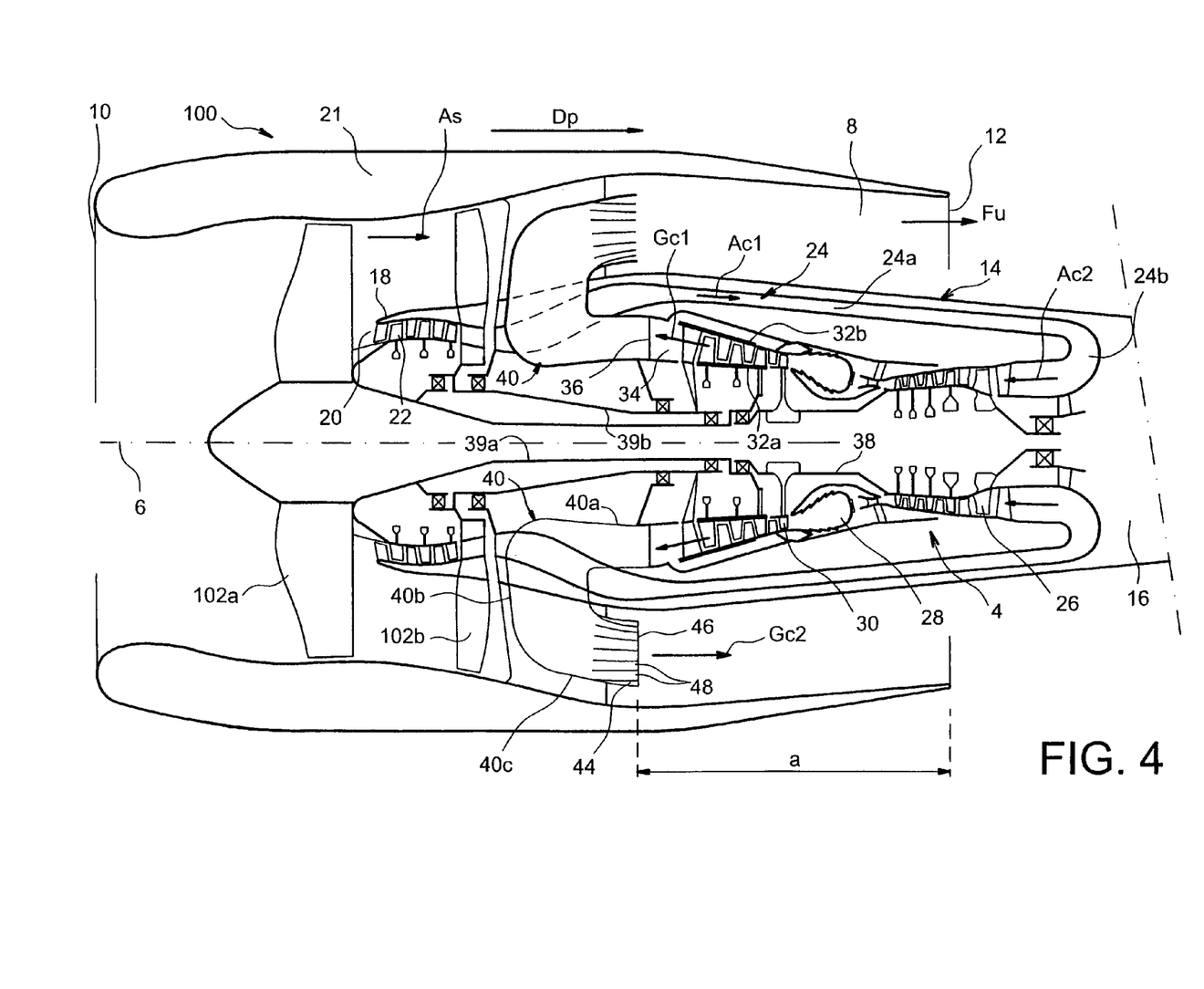
FIG. 4 shows a longitudinal sectional view of a turbomachine according to a second preferred embodiment of this invention.

FIG. 4 shows a turbomachine 100 for an aircraft, according to a second preferred embodiment of the invention.

Note that the turbomachine 100 is almost identical to the turbomachine 1 described above. Consequently, elements in FIGS. 1 to 5 marked with the same numeric references correspond to identical or similar elements.

As can be seen in FIG. 4, the main difference between this turbomachine 100 and the turbomachine described earlier is that the turbomachine 100 is provided with two counter-rotating fans 102a and 102b, which are arranged at the same position as the conventional fan 2 in the turbomachine 1 in the first preferred embodiment.

This specific arrangement can thus significantly reduce fan noise emitted by the turbomachine 100, compared with noise emitted by the turbomachine 1.

Moreover, it can be seen that the LP turbine 32, which is also counter-rotating and comprises an internally bladed rotor 32a and an externally bladed rotor 32b, is connected to these same fans 102a and 102b through a system of concentric shafts 39a and 39b, the shafts 39a and 39b then transmitting the torque from bladed rotors 32a and 32b to fans 102a and 102b respectively, to drive these counter-rotating fans 102a and 102b.

Note that in this second preferred embodiment of the invention, the LP compressor 22 is also counter rotating in the sense that the front open part 18 of the noise suppression structure 14 is bladed internally and is fixed to the fan 102b, while the externally bladed internal rotor is fixed to the shaft 39a.

In particular, it can be seen that the turbomachine 100 is provided with the same number of mixer struts 40 and a combustion chamber 28 in the inverted position also radiating towards the upstream direction, such that this turbomachine 100 is also capable of reducing jet noise emissions and combustion chamber noise emissions, in the same way as described above.

Figure 5:
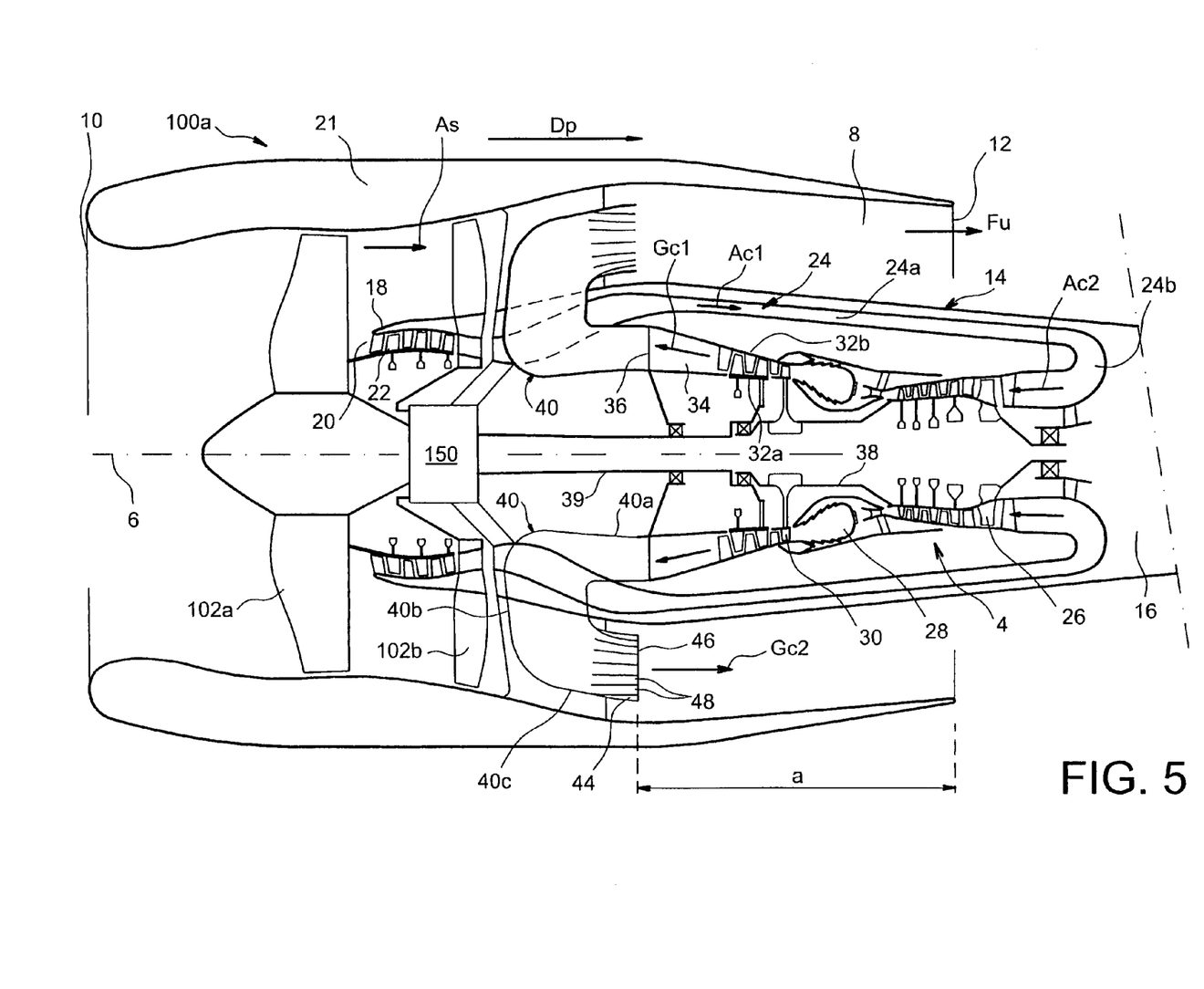
FIG. 5 shows a longitudinal sectional view of a turbomachine according to a second alternative preferred embodiment shown in FIG. 4.

FIG. 5 shows a turbomachine 100a according to an alternative to the second preferred embodiment described above.

As can be seen in this Figure, the main difference is in the fact that the fans 102a and 102b are no longer driven directly using shafts 39a and 39b that are replaced by the single second shaft 39, but rather through a differential speed reduction gear 150 placed between the single rotation LP turbine 32 and the fans 102*a* and 102*b*.

Obviously, a person skilled in the art could make various modifications to turbomachines 1, 1*a*, 100 and 100*a* for aircraft that have just been described solely as non-limitative examples.

The invention claimed is:

1. A turbomachine for an aircraft comprising:
   a gas generator with a combustion chamber and driving at least one fan,
   an annular fan duct through which secondary air circulates from an upstream side towards a downstream side of the turbomachine, wherein the gas generator is designed such that hot gases are ejected from the combustion chamber towards the upstream side of the turbomachine, and
   a plurality of hollow mixer struts connected to an output from the gas generator through which hot gases can pass, each mixer strut comprising an output mixer portion located inside the annular fan duct so as to mix the secondary air and the hot gases ejected by these output mixer portions towards the downstream side of the turbomachine,
   wherein the output mixer portion of each mixer strut is approximately in the shape of a lobed mixer, and each mixer strut has a plurality of lobes.

2. A turbomachine according to claim 1, wherein the gas generator is a twin-shaft gas generator.

3. A turbomachine according to claim 2, wherein the twin-shaft gas generator comprises a low pressure compressor through which combustion air passes from the upstream side towards the downstream side, a high pressure compressor through which combustion air passes from the downstream side towards the upstream side, the combustion chamber, and a high pressure turbine and a low pressure turbine, with hot gases passing through each in the direction from the downstream side towards the upstream side of the turbomachine.

4. A turbomachine according to claim 3, wherein the high pressure turbine drives the high pressure compressor, and wherein the low pressure turbine drives the low pressure compressor and each of the turbomachine fans.

5. A turbomachine according to claim 1, including a single fan.

6. A turbomachine as claimed in claim 1, including two counter-rotating fans.

7. A turbomachine as claimed in claim 1, further comprising a noise suppression structure surrounding the gas generator, said noise suppression structure delimiting the inner part of the annular fan duct and being closed at the back of the turbomachine.

8. A turbomachine as claimed in claim 1, wherein each mixer strut includes an input portion through which hot gases pass in the direction from the downstream side towards the upstream side, with the output mixer portion on the inside of the annular fan duct and through which these same hot gases pass in the direction from the upstream side to the downstream side, the input portion and the output portion being connected through a cranked portion.

9. A turbomachine according to claim 1 or claim 8, wherein the output mixer portions of the mixer struts are uniformly spaced inside the annular fan duct.

* * * * *